3,064,990
HAND TRUCK
Anthony R. Salvucci, Santa Monica, Calif.
(10548 Putney Road, Los Angeles 64, Calif.)
Filed Jan. 3, 1961, Ser. No. 80,309
8 Claims. (Cl. 280—47.2)

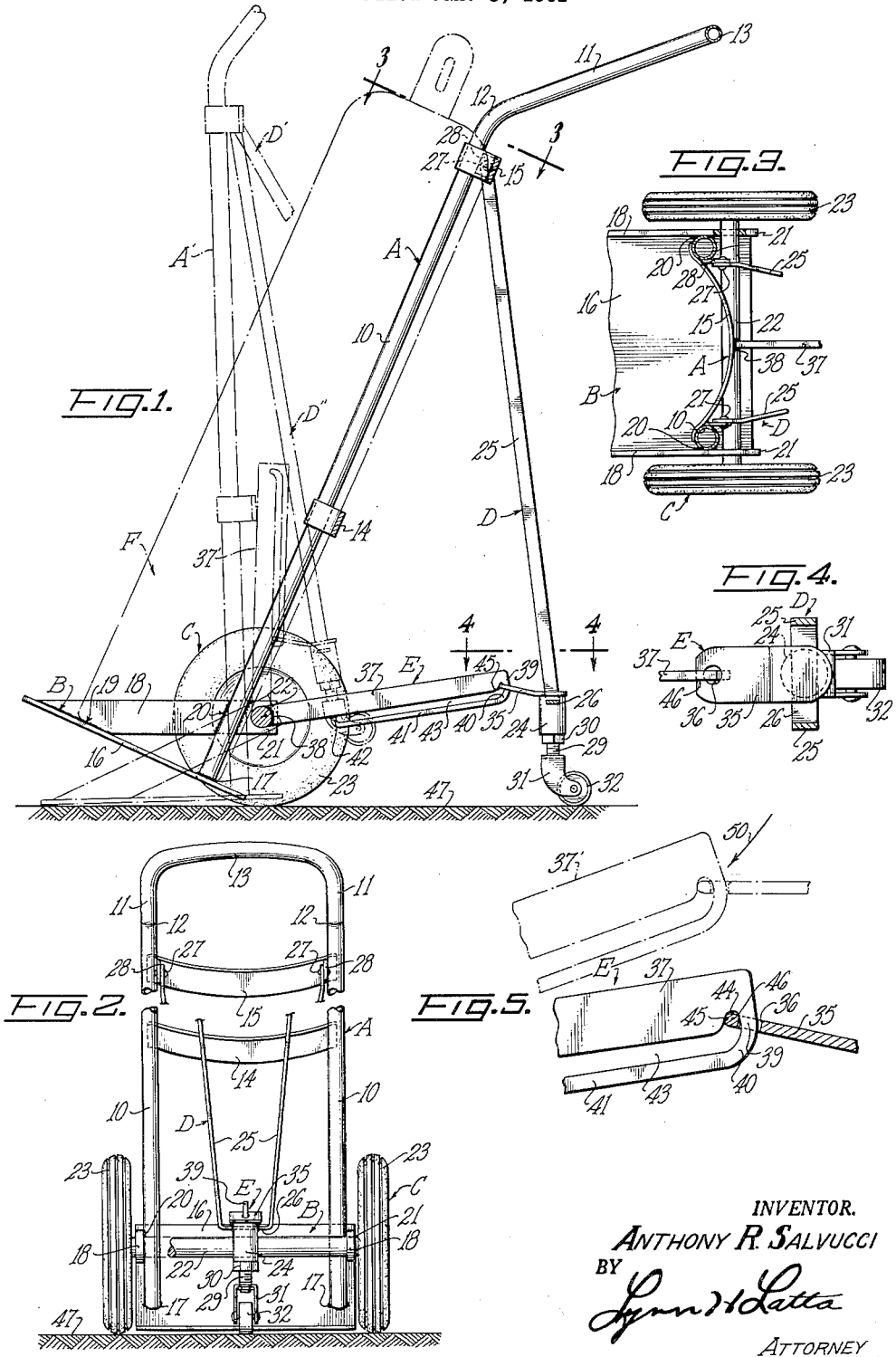

This invention relates to hand trucks such as are utilized in moving oxygen and oxy-acetylene bottles or tanks around a machine shop where welding operations are transpiring, or in handling such bottles during transportation of filled bottles from a source to a customer and of empty bottles from the customer back to the source, for refilling.

The primary object of the invention is to provide a light weight hand truck for maximum facility in moving such bottles around in a localized area such as a machine shop or factory, and having means providing a stand for supporting tthe bottle in any location to which it has been moved, said supporting means being collapsible to facilitate the manipulation of the truck when it is being moved about.

The invention is also applicable to medical hand trucks for use in hospitals in transporting oxygen bottles used in oxygen therapy.

More specifically, the invention aims to provide an improved and simplified collapsible stand structure in a hand truck of maximum sturdiness and durability.

A further and important object is to provide such a collapsible stand structure having a gravity responsive action controlled by tilting the truck about its wheel axle. Furthermore, the invention contemplates a collapsible stand arrangement which is gravity responsive both in a collapsing direction and in an opening direction, depending upon the direction in which the truck is tilted around its wheels.

Other objects and advantages will become apparent in the ensuing specifications and appended drawing in which:

FIG. 1 is a longitudinal sectional view of a hand truck embodying my invention, taken in a vertical plane normal to its wheel axis at approximately the center thereof;

FIG. 2 is a rear elevational view of the same;

FIG. 3 is a transverse sectional view of the upper portion of the truck taken as indicated by line 3—3 of FIG. 1;

FIG. 4 is a detail transverse sectional view of the rear caster support and associated parts taken on the line 4—4 of FIG. 1; and FIG. 5 is a fragmentary detail sectional view of the same, in a longitudinal vertical plane thereof.

Referring now to the drawings in detail, I have shown therein, as an example of one form in which the invention may be embodied, a collapsible hand truck comprising, in general, a cradle A, a bottom or platform B, a rolling wheel support C for transportation of the truck on a floor surface, a gravity-responsive collapsible floor stand rear leg unit D, and gravity-responsive connecting linkage E for bracing the rear leg D in an open position, shown in FIG. 1, in which it cooperates with the cradle A and wheels C to provide a stand for supporting an oxygen bottle or the like F in a position of use.

Cradle A comprises a pair of parallel legs 10 of fairly rigid, strong bar material, preferably tubular for a maximum combination of strength and lightness; a pair of arms 11, joined integrally to respective legs 10 by approximately 135° bends 12; and a handle 13 bridging between the upper rearward ends of arms 11 and constituting therewith an integral yoke of U-shape as shown in FIG. 2.

Cradle A also includes a pair of bottle-support cross bars 14 and 15, which may be of strap metal as indicated, having respective ends overhanging the forward sides of legs 10 and secured thereto in any suitable manner as by riveting or welding, and having downwardly arched central portions constituting seats against which the side of bottle F may rest as indicated.

Platform B may be simply a rectangular metal plate 16 extending transversely between the lower ends of legs 10 and having its rear corner areas secured thereto, as by welding, indicated at 17; and a pair of braces 18 (which may be of strap metal as shown) having forward ends cut on a bias and secured, as by welding 19, to the forward corners of the plate 16, and having their rear end portions in crossed relation to the lower end portions of legs 10, engaging the outer sides thereof and secured thereto as by welding, indicated at 20. Relatively short rear end portions of braces 18 project rearwardly beyond legs 10 to constitute a pair of bracket ears 21 which are provided with circular apertures.

Rolling wheel support C comprises an axle 22 which is extended through the respective circular apertures in bracket ears 21 (see FIG. 3) and is freely rotatable therein; and a pair of transportation wheels 23, mounted upon the respective ends of axle 22 projecting beyond the ears 21. Wheels 23 are rotatably mounted upon the ends of axle 22 through suitable anti-friction bearings and retained by suitable conventional retainer means from escaping from the ends of the axle (such bearing and retainer means being so well known that they are not illustrated herein).

Rear leg unit D comprises a narrow yoke of strap metal, consisting in a pair of legs 25 having laterally bent lower end portions 26 secured to respective sides of a boss 24. Legs 25 diverge upwardly at a narrow angle and at their upper ends, are joined by pivots 27 (e.g. rivets or bolts) to respective ears 28 which are welded to the inner sides of respective legs 10 of cradle A and project rearwardly therefrom. Also the ears 28 can be welded as indicated, to the rear face of the upper cross bar 15 between the legs 10, or such could be used, alternatively, as the sole connection between ears 28 and cradle A.

Adjustably threaded into the lower end of boss 24 is a stem 29, secured by a lock nut 30. The yoke 31 of a caster roller 32 is rotatably mounted on the lower end of stem 29. Roller 32, conjointly with the laterally spaced rollers 23, the cradle 10 and the collapsible rear leg unit D, provide a tripod stand for the truck when supporting the tank F for use.

Connecting linkage E comprises a tongue 35 the rear end of which is secured, as by welding, to the upper end of boss 24 and the forward end portion thereof, projecting forwardly from boss 24, being provided with an aperture 36 (FIG. 4). Linkage E further includes an arm 37 disposed in a vertical plane (the median vertical plane of cradle A and rear leg unit D) and having its forward end secured, as by welding, to the rear side of shaft 22 at the center thereof. This connection is indicated at 38. At its rear end, arm 37 has a hook 39 projecting downwardly (FIG. 5) through the aperture 36 in tongue 35, substantially at right angles to the longitudinal axis of the arm, and joined by a forwardly curved bend 40 to a rail 41 which extends beneath the arm 37 in spaced parallel relation thereto, to a point near the forward end thereof, where it terminates in an upwardly bent finger 42 secured to the underside of arm 37 (FIG. 1). A longitudinal slot 43 is defined between rail 41 and arm 37. At its rear end, slot 43 bends upwardly corresponding to the curved bend 40, to provide a keeper notch 44 extending above the lower margin of arm 37. Said lower margin terminates at its rear extremity in a latching shoulder 45 which defines the forward side of notch 44.

Defined between the aperture 36 and the forward end of tongue 35 is a transverse coupling loop 46 which is receivable in the notch 44 and engageable against the shoulder 45 to latch the rear end of arm 37 to the forward end of tongue 35 in the relative positions shown in FIG. 1 and 5, thereby linking and bracing the cradle A and leg unit B to one another in their spread relation shown in FIG. 1. Shoulder 45 and curved rear end part 40 of rail 41 may either or both of them function as camming parts, as explained hereinafter.

*Operation*

With the cradle and leg units A and B thus braced in their spread condition, they cooperatively provide a tripod or A-stand for supporting the bottle F for use. In such stand, as supported upon a floor or other horizontal supporting surface 47, the cradle A is inclined upwardly and rearwardly and the platform 16 is inclined upwardly and forwardly so that the bottle F may be securely cradled in the truck, with little or no danger of being pulled over onto the floor even when subjected to some pull from an oxygen hose attached thereto.

When it is desired to wheel the truck to another position, the operator simply grasps the handle 13, lifts it, and tilts the truck toward the forward limit position shown at A' in broken lines in FIG. 1, wherein the toe of the platform 16 contacts the floor surface 47. As the truck approaches this position, the rear leg unit D will be lifted upwardly and rearwardly to a position of rearward extension somewhat as indicated in dotted lines at D' in FIG. 1, and under the weight of its projecting rear end exerted downwardly and toward the cradle A, it will tend to swing toward the latter. At the same time, the arm 37, tilted upwardly to approximately the inclination shown in dotted lines in FIG. 5 at 37', will have its shoulder 45 disposed at such an inclination with respect to the angle (indicated by arrow 50) at which the loop 46, under the weight of rear leg unit D, attempting to swing downwardly and forwardly around the axis of its pivots 27, bears against the shoulder 45, that the resulting camming action between the loop 46 and the shoulder 45 (or between the camming part 40 and the transverse surface of tongue 35 at the rear side of aperture 36) will be effective to raise the arm 37 sufficiently to permit the loop 46 to pass beneath the shoulder 45 and into the slot 43. The rear leg unit D will then swing forwardly by gravity, further raising arm 37, until stopped by contact arm 37 against the lower cross bar 14 of cradle A, with the parts collapsed as indicated by the broken lines at D'' in FIG. 1. In the vertically swinging movements of arm 37, axle 22 will pivot in the apertures in ears 21 sufficiently to accommodate such swinging movements.

For loading and unloading the truck, the toe of platform 16 may be rested against the floor surface 47 in the position indicated at A' in FIG. 1.

After the truck with its load has been wheeled to a new position, it can be restored to its stand condition shown in FIG. 1 by simply moving the handle 13 downwardly and rearwardly, tilting the truck around the wheel axle 22, and the leg unit D will then swing rearwardly by gravity in an initial stage of rearward swinging movement, and by momentum in a final stage thereof, while the arm E swings downwardly by gravity, following the rearward movement of tongue 35, until the loop 46 again enters the notch 44. In the event the rearwardly swinging movement should be manipulated in such a way as to fail to achieve the full opening, the leg caster 32 can be fulcrummed against the floor, and pressure exerted downwardly against handle 13 tending to lift thte platform 16 and wheels 23 away from the floor surface 47, whereupon a rearward component of the reactive load against the lower end of leg unit D will cause the latter to complete its rearward movement to the latched position of FIG. 1.

I claim:

1. In a hand truck: a cradle functioning as a back support for an elongated article; a wheel unit mounted to the lower end portion of said cradle for rolling support of the truck on a floor surface; a platform secured to the lower end of said cradle and projecting forwardly therefrom, providing a bottom support for said article; a rear leg unit pivoted on a transverse horizontal axis at its upper end to said cradle for gravity-responsive, free-swinging movement of its lower portion, and having a floor-engaging part at its lower end; and gravity responsive linkage connecting lower portions of said cradle and rear leg unit to one another, comprising an arm having a forward end pivotally attached to said cradle at the lower end of the latter, for vertical swinging movement of the rear end of said arm, and a link secured to the lower portion of said rear leg unit; projecting forwardly and having a transverse coupling part slidably coupled to said arm for sliding movement longitudinally thereof, said arm having at its rear end, latching means operable by gravity responsive downward movement of said arm, to latch said link to the rear end of said arm to resist either spreading or approaching movement of said cradle and leg unit, thereby providing an A-stand for supporting said truck in a condition of rest on a floor surface said latching means comprising a camming part cooperable with said transverse coupling part in a manner to lift the rear end of said arm through camming action between said parts in response to forward pressure of said transverse coupling part against said camming part under the weight of the lower end of said rear leg unit when lifted and projected forwardly by forward tilting of said truck about the rolling axis of said wheel support.

2. A hand truck as defined in claim 1, wherein said arm is provided with a longitudinally extending slot slidably receiving said transverse coupling part and terminating at its rear end in an upwardly projecting notch in which said transverse coupling part is receivable with a latching action when said cradle and rear leg unit are spread apart and said rear leg unit and wheel support are in contact with the floor surface.

3. A hand truck as defined in claim 2, wherein said arm includes an upward body portion and a lower portion in the form of a rail parallel to and spaced downwardly from the lower margin of said body portion, the rear end part of said rail being curved upwardly and joined to the rear end of said body portion to constitute said camming part and defining one side of said notch, and wherein said link has at its forward end a transverse surface spaced rearwardly from said coupling part, defining therewith a space in which said rail is received and slidable, and engageable with said rear end part to develop said camming action.

4. In a hand truck: a cradle functioning as a back support for an elongated article; a wheel unit mounted to the lower end portion of said cradle for rolling support of the truck on a floor surface; a platform secured to the lower end of said cradle and projecting forwardly therefrom, providing a bottom support for said article; a rear leg unit pivoted on a transverse horizontal axis at its upper end to said cradle for gravity-responsive, free-swinging movements of its lower portion, and having a floor-engaging part at its lower end; and gravity responsive linkage connecting lower portions of said cradle and rear leg unit to one another, comprising an arm having a forward end pivotally attached to said cradle at the lower end of the latter, for vertical swinging movement of the rear end of said arm, and a link secured to the lower portion of said rear leg unit, projecting forwardly, and having a transverse coupling part slidably coupled to said arm for sliding movement longitudinally thereof, said arm having at its rear end, latching means operable by gravity responsive downward movement of said arm, to latch said link to the rear end of said arm to resist either spreading or approaching movement of said cradle and leg unit, thereby providing an A-stand for supporting said truck in a condition of rest on a floor surface; said latching means comprising a camming part cooperable with said transverse coupling part in a manner to lift the rear end of said arm through camming action between said parts in response to forward pressure of said transverse coupling part against said camming part under the weight of the lower end of said rear leg unit when lifted and projected forwardly by forward tilting of said truck about the rolling axis of said wheel support, said arm being provided with a longitudinally extending slot slidably receiving said transverse coupling part and terminating at its rear end in an upwardly projecting notch in which said transverse coupling part is receivable with a latching action when said cradle and rear leg unit are spread apart and said rear leg unit and wheel support are in contact with the floor surface, said camming part consisting in a downwardly and forwardly curved shoulder defining the forward side of said notch.

5. In a hand truck: a cradle functioning as a back support for an elongated cylindrical article such as an oxygen bottle; a wheel unit including an axle pivotally mounted to the lower end portion of said cradle and wheels rotatable on the ends of said axle, for rolling support of the truck on a floor surface; a platform secured to the lower end of said cradle and projecting forwardly therefrom, providing a bottom support for said article; a rear leg unit pivoted on a transverse horizontal axis at its upper end to said cradle for gravity-responsive, free-swinging movement of its lower portion, and having a floor engaging part at its lower end; and gravity-responsive linkage connecting lower portions of said cradle and rear leg unit to one another comprising an arm having a forward end attached to said axle for vertically swinging movement of its rearward end, said arm comprising an upward body portion and a lower portion in the form of a narrow rail parallel to and spaced downwardly from the lower margin of said body portion so as to define a longitudinal slot, said rail having end parts joining it to said body portion, the rear end part being curved upwardly and rearwardly and joined to the rear end of said body portion at a point above the lower margin of said body portion, with a notch being defined between said rear end part and a shoulder being defined by the rear end of said body portion as the forward side of said notch, and a tongue having a rear end secured to the lower end portion of said rear leg unit and projecting forwardly therefrom, said tongue having a forward end portion in the form of a transverse loop linked through said slot and around said rail for sliding movement in said slot and for reception in said notch to latch said tongue to the rear end of said arm with said cradle and rear leg unit spread apart, said forward end of said tongue cooperating with the rear end of said arm with a camming action which becomes effective when the truck is tilted forwardly, to raise the rearward end of said arm and to release said loop for longitudinal sliding movement in said slot whereby said rear leg unit may swing by gravity to a collapsed position adjacent the rear side of said cradle.

6. A hand truck as defined in claim 5, wherein said rear leg unit has at its lower end a castering roller support for castering engagement with the floor surface.

7. In a hand truck: a cradle functioning as a back support for an article, said cradle comprising a pair of tubular legs disposed in laterally spaced relation, a yoke integrally joining the upper ends of said legs and extending rearwardly therefrom, said yoke including a transverse handle, and cross bars bridging between and having their ends secured to said leg, the upper bar being disposed adjacent the forward extremity of said yoke and the lower bar being disposed toward the lower end of said cradle, said cross bars being downwardly arched to provide a back rest for an elongated cylindrical article such as an oxygen bottle; a platform comprising a plate having rear corners secured to the lower ends of said leg, said platform projecting forwardly therefrom, and a pair of braces having forward ends secured to the forward corners of said platform and having rear end portions crossing and secured to the outer faces of the lower end portions of said legs and projecting rearwardly therefrom to define a pair of ears having circular apertures therein; a wheel unit including an axle extending through and pivotally mounted in said apertures and wheels rotatably mounted on the respective ends of said axle for rolling support of the truck on a horizontal floor surface; a rear leg unit of narrow yoke form including a pair of rear legs having their upper ends pivoted to said cradle adjacent the ends of said upper cross bar for gravity-responsive, free-swinging movement of its lower portion, a vertical boss to which the lower ends of said rear legs are secured, and a castering roller support mounted in the lower end of said boss for castering support of said rear leg unit against a floor surface; and gravity-responsive linkage connecting lower portions of said cradle and rear leg unit, comprising an arm having a forward end mounted to the center of said axle for upward swinging movement of its rear end, said arm including an upward body portion and a relatively narrow rail spaced below and parallel to the lower margin of said body portion to define a longitudinal slot and having a forward end part joined to said body portion and, at its rear end, an upwardly curved hook element joined to the rear extremity of said body portion, said body portion having at its rear end a shoulder spaced forwardly from said hook element to define a notch extending upwardly from the rear extremity of said slot, and a tongue secured upon the upper end of said boss and projecting forwardly therefrom and having at its forward end a transverse loop extending through said slot and linked around said rail to provide a linking connection between said arm and said tongue, said loop being automatically receivable in said notch in response to gravity responsive downward movement of the rear end of said arm when said rear leg unit and cradle are spread apart, and said loop then being engageable in said notch to latch said rear leg unit and cradle in their spread condition, resisting either collapsing or spreading movement thereof, said tongue being also automatically responsive to gravity loading of said rear leg unit when said truck is tilted forwardly around said wheel unit, to effect a camming action of said tongue with said hook element, to lift the rear end of said arm and permit said rear leg unit to swing forwardly to collapsed relation to said cradle while said loop slides forwardly in said slot.

8. In a hand truck: a cradle functioning as a back support for an elongated article; a wheel unit mounted to the lower end portion of said cradle for rolling support of the truck on a floor surface; a platform secured to the lower end of said cradle and projecting forwardly therefrom, providing a bottom support for said article; a rear leg unit pivoted on a transverse horizontal axis at its upper end to said cradle for gravity-responsive, free-swinging movement of its lower portion, and having a floor-engaging part at its lower end; and gravity responsive linkage connecting lower portions of said cradle and rear leg unit to one another, comprising an arm having a forward end pivotally attached to said cradle at the lower end of the latter, for vertical swinging movement of the rear end of said arm, said arm including an upward body portion and a relatively narrow rail spaced below and parallel to the lower margin of said body portion to define a longitudinal slot and having a forward end part joined to said body portion and, at its rear end, an upwardly curved hook element joined to the rear extremity of said body portion, the said body portion having at its rear end a shoulder spaced forwardly from said hook element to define a notch extending upwardly from the rear extremity of said slot, and a tongue secured to the lower portion of said leg unit and projecting forwardly therefrom and having at its forward end a transverse loop extending through said slot and linked around said rail to provide a linking connection between said arm and said tongue, said loop being automatically receivable in said notch in response to gravity responsive downward movement of the rear end of said arm when said rear leg unit and cradle are spread apart, and said loop then being engageable in said notch to latch said rear leg unit and cradle in their spread condition, resisting either collapsing or spreading movement thereof, said tongue being also automatically responsive to gravity loading of said rear leg unit when said truck is tilted forwardly around said wheel unit, to effect a camming action of said tongue with said hook element, to lift the rear end of said arm and permit said rear leg unit to swing forwardly to collapsed relation to said cradle while said loop slides forwardly in said slot.

References Cited in the file of this patent

UNITED STATES PATENTS

| | | |
|---|---|---|
| 292,041 | Page | Jan. 15, 1884 |
| 2,230,015 | Rich | Jan. 28, 1941 |
| 2,606,770 | Reichert | Aug. 12, 1952 |